United States Patent
Imoto (10) Patent No.: US 7,359,001 B2
(45) Date of Patent: Apr. 15, 2008

(54) CAMERA DEVICE AND VEHICLE PERIPHERY MONITORING APPARATUS

(75) Inventor: Masayoshi Imoto, Aichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 944 days.

(21) Appl. No.: 10/722,424

(22) Filed: Nov. 28, 2003

(65) Prior Publication Data
US 2004/0169762 A1    Sep. 2, 2004

(30) Foreign Application Priority Data
Dec. 2, 2002   (JP) ............................. 2002-350006

(51) Int. Cl.
H04N 7/00 (2006.01)
H04N 7/18 (2006.01)
H04N 9/47 (2006.01)
H04N 5/225 (2006.01)
H04N 9/07 (2006.01)

(52) U.S. Cl. ............ 348/373; 348/374; 348/148; 348/218.1; 348/36; 348/337

(58) Field of Classification Search ............... 348/148, 348/337, 373, 374, 336, 340, 369, 218.1, 348/36, 38, 39; 359/678, 725, 831
See application file for complete search history.

(56) References Cited

U.S. PATENT DOCUMENTS

| | | | |
|---|---|---|---|
| 5,708,857 A * | 1/1998 | Ishibashi | 396/21 |
| 5,756,988 A * | 5/1998 | Furuta | 250/208.1 |
| 5,959,555 A * | 9/1999 | Furuta | 340/937 |
| 6,166,764 A * | 12/2000 | Sakata | 348/148 |
| 6,587,285 B2 * | 7/2003 | Imoto | 359/831 |
| 6,788,478 B2 * | 9/2004 | Imoto | 359/831 |
| 7,030,926 B2 * | 4/2006 | Miyake et al. | 348/340 |
| 7,253,833 B2 * | 8/2007 | Imoto | 348/148 |
| 2005/0057651 A1 * | 3/2005 | Imoto et al. | 348/148 |

FOREIGN PATENT DOCUMENTS

| | | |
|---|---|---|
| JP | A-11-027656 | 1/1999 |
| JP | U-3063778 | 9/1999 |
| JP | A 2000-089301 | 3/2000 |
| JP | A-2002-010117 | 1/2002 |
| JP | A-2002-036952 | 2/2002 |
| JP | A-2002-077896 | 3/2002 |

\* cited by examiner

Primary Examiner—Lin Ye
Assistant Examiner—Richard M Bemben
(74) Attorney, Agent, or Firm—Oliff & Berridge, PLC (57) ABSTRACT

A pair of left and right prisms are disposed on part of the region in front of the image pickup unit. A wide-angle lens is disposed on another part of region in front of the image pickup unit. Tapered supporting members of a prism holder for supporting the prisms located between the prisms and the wide-angle lens are formed so as to be reduced in thickness gradually toward the image pickup unit.

14 Claims, 6 Drawing Sheets

CAMERA DEVICE AND VEHICLE PERIPHERY MONITORING APPARATUS

BACKGROUND OF THE INVENTION

1. Field of the Invention

The present invention relates to a camera device for imaging a plurality of directions in the visual field simultaneously and a vehicle periphery monitoring apparatus using the camera device.

2. Description of the Related Art

Figure 8:
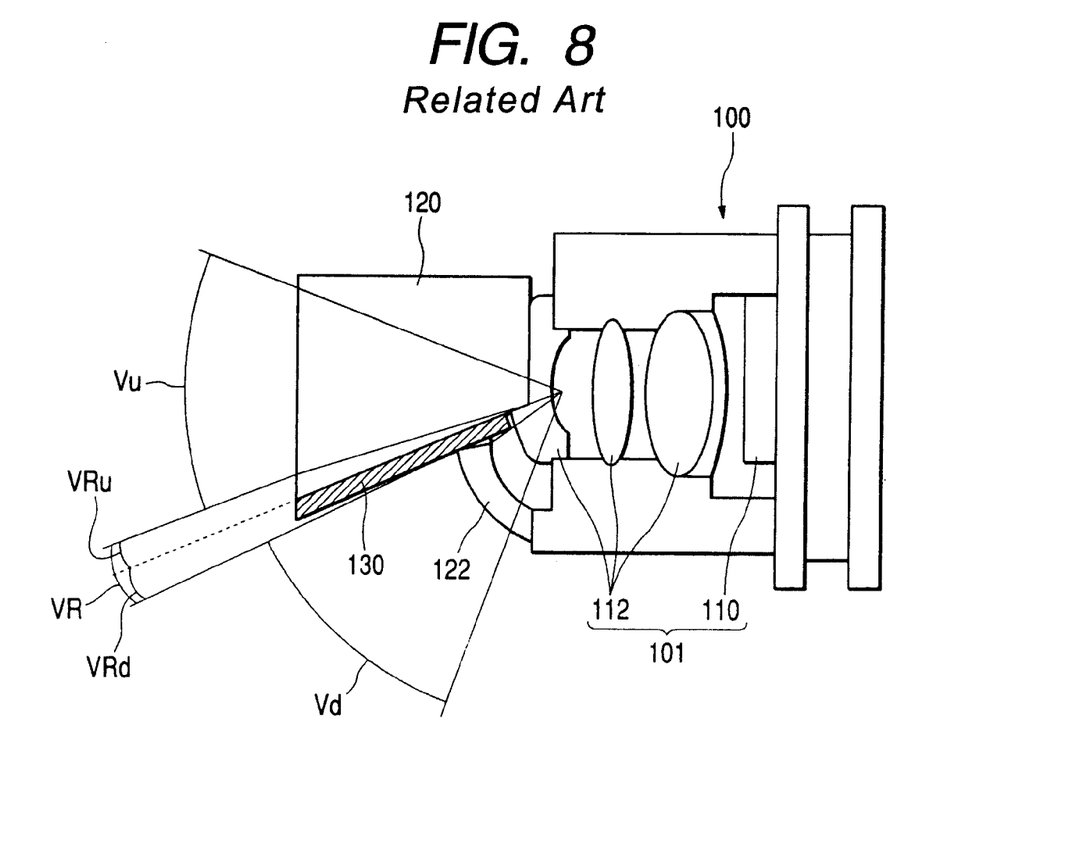
FIG. 8 is a schematic side view of a camera device in the related art.

There is proposed a camera device capable of imaging a plurality of directions in the visual field simultaneously as shown in FIG. 8.

A camera device 100 includes an image pickup unit 101 having a single image pickup device 110 and an image pickup lens 112 disposed in front of the image pickup device 110.

A prism 120 is disposed in front of the image pickup unit 101 on the upper side. Incident beams entering from both of the left and the right sides are guided by the prism 120 toward the image pickup unit 101 so that an image is formed on the image pickup device 110 via the image pickup lens 112.

A wide-angle lens 122 is disposed in front of the image pickup unit 101 on the lower side. An incident beam from the lower side is guided by the wide-angle lens 122 toward the image pickup unit 101, so that an image is formed on the image pickup device via the image pickup lens 112.

In other words, it is structured in such a manner that images of the visual field in both of the left and the right directions in front of the camera device 100 in the upper region Vu of the vertical angle of view of the image pickup unit 101 are picked up with the intermediary of the prism 120, and an image of a visual field on the lower side of the camera device 100 in the lower region Vd of the vertical angle of view of the image pickup unit 101 is picked up via a wide-angle lens 122.

A predetermined image processing is performed for an image picked up by such camera device 100 and the image after processing is displayed on a display device, such as a liquid crystal display device.

Figure 9:
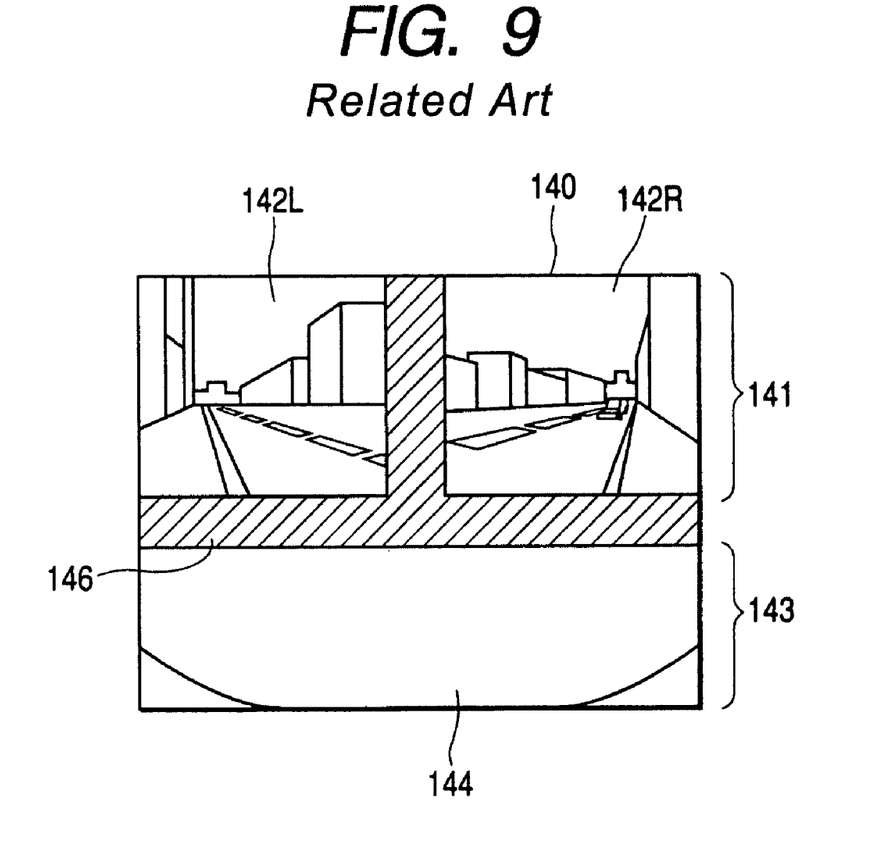
FIG. 9 is a drawing showing an example of a display image of the camera device in the related art.

An example of the image displayed on the display device will be shown in FIG. 9. In FIG. 9, images of the visual fields 142L and 142R on the left and the right sides in front of the camera device 100 are shown in an upper half region 141 of a display image 140, and an image of the visual field 144 on the lower side in front of the camera device 100 is shown in a lower half region 143 of the display image 140.

As a publication disclosing a camera device capable of imaging a plurality of visual fields simultaneously, such as the one described above, there is a document JP-A-2000-089301, for example.

However, in the camera device 100 shown in FIG. 8, there is a problem in that the ineffective region VR, where an image cannot be picked up, is generated between the upper region Vu and the lower region Vd, and a relatively large ineffective region 146 is generated between the images of the visual fields 142L and 142R on the left and the right front sides and the visual field on the lower front side 144.

The reason why the lower ineffective region VRd of the ineffective region VR is generated is as follows. In the camera device 100, a supporting member 130 for supporting the prism 120 from below for supporting the same at a predetermined position is disposed on the bottom of the prism 120, that is, interposed between the prism 120 and the wide-angle lens 122. Especially when the construction in which the prism 120 is inserted into the camera device 100 from above is employed, provision of the supporting member 130 on the bottom side of the prism 120 is substantially required. In such a case, the supporting member 130 is disposed at a position relatively close to the image pickup unit 101, and thus the supporting member 130 is to be imaged over a relatively large angle of view.

The upper ineffective region VRu is generated by the difference in index of refraction between air and the prism 120. In other words, when a light beam enters into the prism 120, the light beam is refracted to a direction closer to the normal line of the incident surface of the prism 120 by the difference in refractive index between air and the prism 120. Therefore, the light beam entered into the prism 120 through the bottom of the prism 120 is reflected irregularly from or absorbed in a rough surface of the bottom of the prism 120, and thus will never form an image on the image pickup device 110. In this manner, the upper ineffective area VRu is generated due to the difference in refractive index between air and the prism 120.

SUMMARY OF THE INVENTION

It is therefore an object of the invention to provide a camera device and a vehicle periphery monitoring apparatus in which the intervention of a member for supporting an optical device in the image can be minimized.

In order to achieve the object, according to a first aspect of the invention, there is provided a camera device for imaging a plurality of directions in a visual field simultaneously, the device including: an image pickup unit having a single image pickup device and an image pickup lens disposed in front of the image pickup device; an optical unit disposed in front of the image pickup unit and configured to guide incident light from a plurality of directions in the visual field to the image pickup unit; and a supporting unit for supporting the optical unit, wherein the supporting unit includes a tapered supporting member having a thickness gradually reduced toward the image pickup unit.

According to a second aspect of the invention, there is provided a vehicle periphery monitoring apparatus including: a camera device mounted on a vehicle and configured to pick up images of a plurality of directions in a visual field simultaneously; a processing unit configured to process the image picked up by the camera device; and a display unit installed in a cabin of the vehicle and configured to display the image processed by the processing unit, wherein the camera device includes: an image pickup unit having a single image pickup device and an image pickup lens disposed in front of the image pickup device; an optical unit disposed in front of the image pickup unit and configured to guide incident light from a plurality of directions in the visual field to the image pickup unit; and a supporting unit for supporting the optical unit, wherein the supporting unit includes a tapered supporting member having a thickness gradually reduced toward the image pickup unit.

BRIEF DESCRIPTION OF THE DRAWINGS

The objects and advantages of the present invention will become more apparent by describing a preferred embodiment thereof in detail with reference to the accompanying drawings, wherein.

DETAILED DESCRIPTION OF THE PREFERRED EMBODIMENTS

Referring now to the accompanying drawings, a description will be given in detail of a preferred embodiment of the invention.

A vehicle periphery monitoring apparatus according to an embodiment of the present invention will be described hereinbelow.

Figure 1:
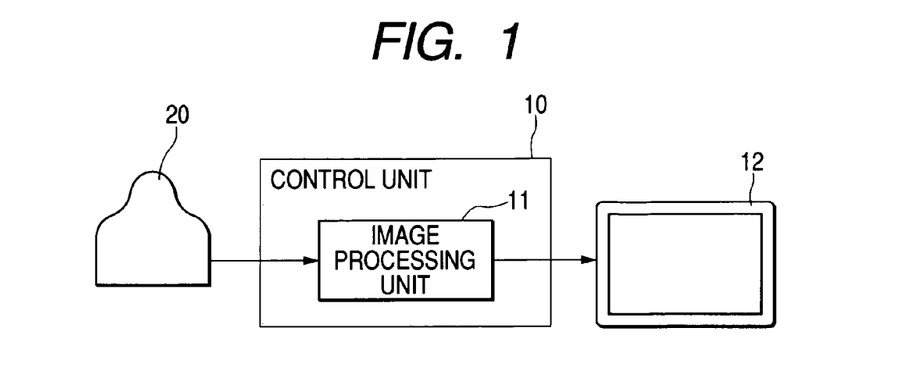
FIG. 1 is a schematic drawing of a vehicle periphery monitoring apparatus according to an embodiment of the present invention.
Figure 2:
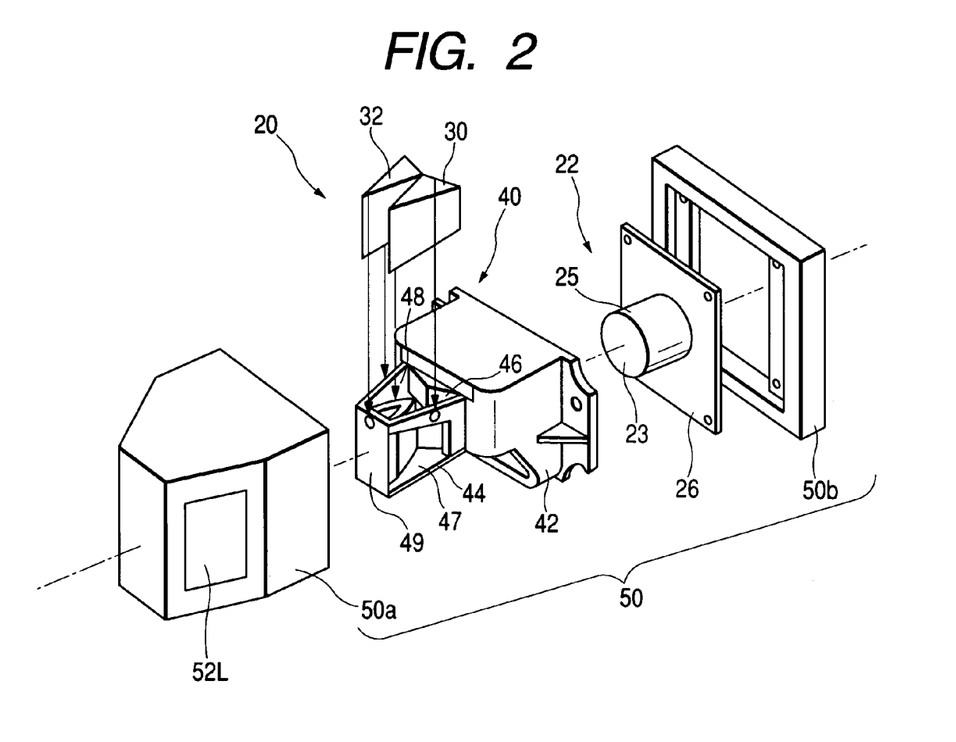
FIG. 2 is an exploded perspective view of a camera device included in the vehicle periphery monitoring apparatus.
Figure 3:
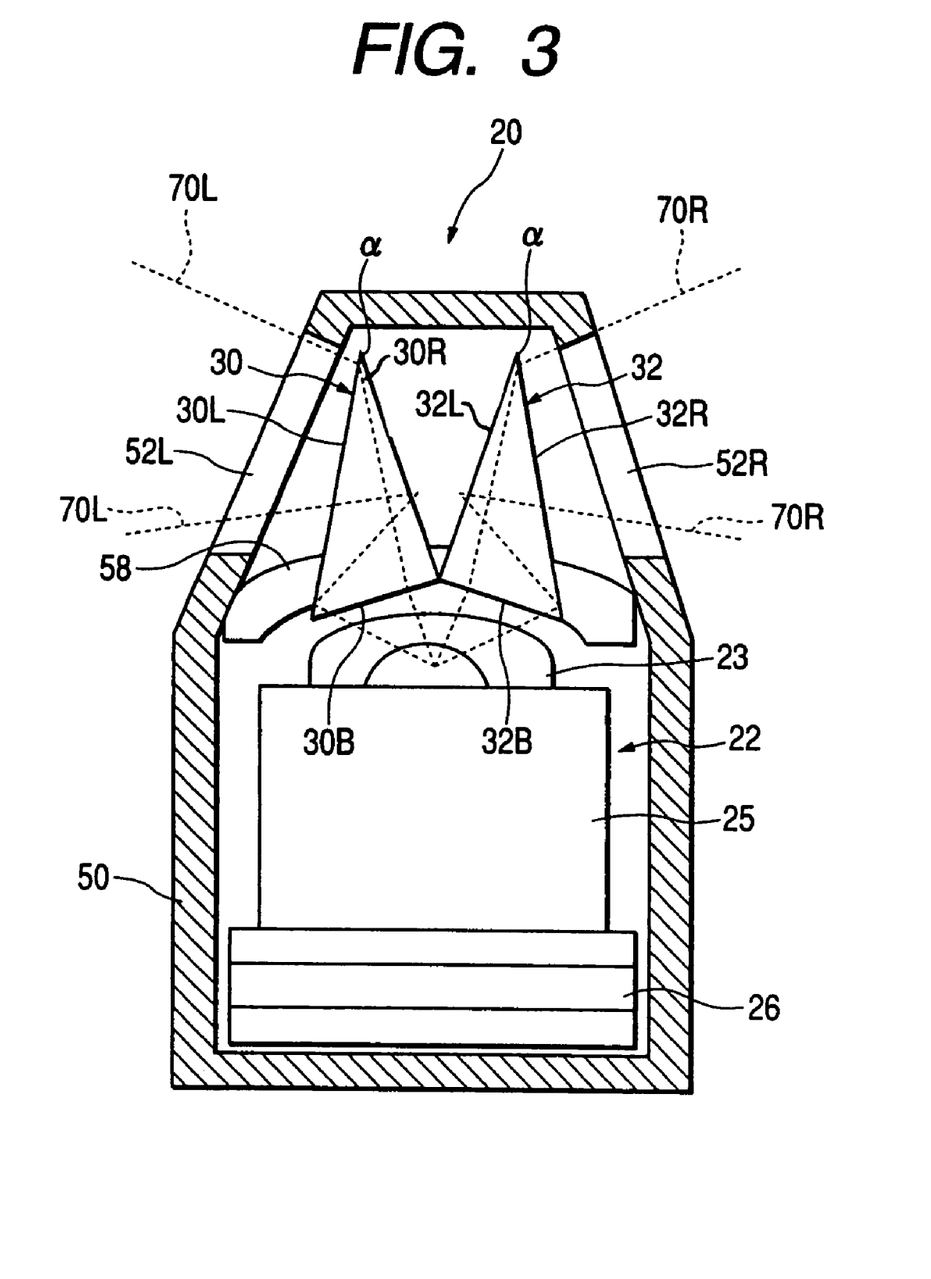
FIG. 3 is a plan schematic drawing of the camera device.
Figure 4:
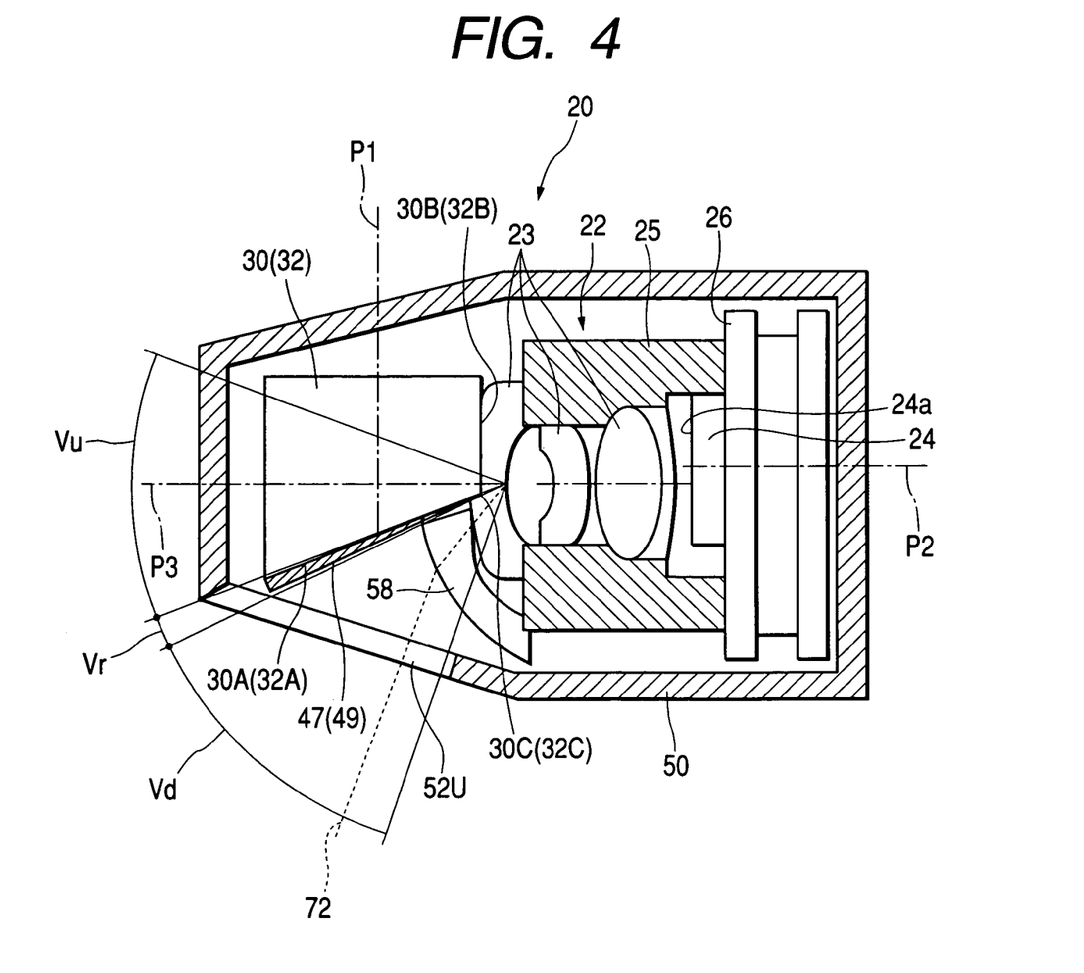
FIG. 4 is a side schematic drawing of the camera device.
Figure 5:
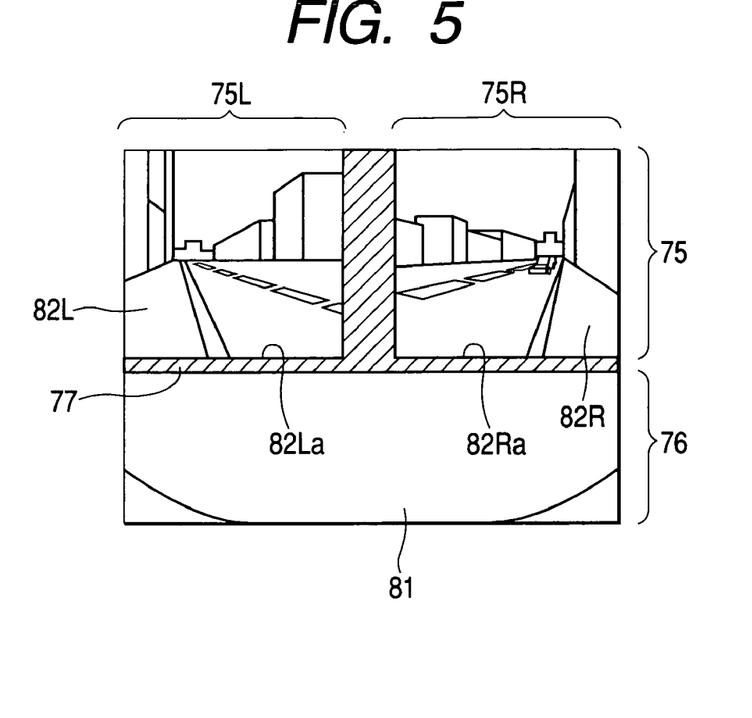
FIG. 5 is a drawing showing an example of a display image of the vehicle periphery monitoring apparatus.

FIG. 1 is a schematic drawing of a vehicle periphery monitoring apparatus; FIG. 2 is an exploded perspective view of a camera device included in the vehicle periphery monitoring apparatus; FIG. 3 is a plan schematic drawing of the camera device; FIG. 4 is a side schematic drawing of the camera device; and FIG. 5 is a drawing showing an example of a display image of the vehicle periphery monitoring apparatus.

As shown in FIG. 1, the vehicle periphery monitoring apparatus includes a single camera device 20, a control unit 10 having an image processing unit 11 for performing a predetermined image processing, and a display device 12, such as a liquid crystal image device installed in a vehicle cabin.

The camera device 20 is used for imaging a plurality of directions in the periphery of the vehicle. In the embodiment, it is assumed that the camera device 20 is installed below an emblem provided at the center of the front portion of the vehicle so as to be able to pick up an image both of the left and the right directions and the lower front direction in front of the vehicle. Alternatively, the camera device 20 may also be installed at the center of the rear portion of the vehicle so as to be able to pick up an image both on the left and the right directions and the lower rear direction at the rear of the vehicle.

The camera device 20 is structured in such a manner that an image pickup unit 22 as image pickup means, a pair of left and right prisms 30, 32 as optical means for guiding light beams 70L, 70R from a plurality of directions in the visual field to the image pickup unit 22, and a prism holder 40 as supporting means for supporting the prisms 30, 32 are stored in a light shielding case 50, as shown in FIG. 2 through FIG. 4. The prism holder 40 is shown in FIG. 2 as a whole, and tapered supporting members 47, 49 are shown as a part in FIG. 4.

The case 50 is formed as a sealed enclosure. The rear half of the case 50 is formed as an enclosure of substantially square in shape in plan view, and includes the image pickup unit 22 stored therein. At least both of the left and the right side portions and the bottom portion of the front half of the case 50 are formed so as to incline inwardly toward the front of the case 50, and the left and right side portions and the bottom portion are formed with transparent windows 52L, 52R, and 52U formed of transparent members respectively.

For example, such case 50 may be manufactured in the following manner. In a first step, the transparent windows 52L, 52R, and 52U and a light shielding portion other than those transparent windows 52L, 52R, and 52U are formed integrally of transparent polycarbonate having a light exposure property. Then, light shielding coating material is applied only on the light shielding portion while masking the portions corresponding to the transparent windows 52L, 52R, and 52U. Subsequently, transparent and colorless hard coat (for example, acrylic UV-cured type) is applied all over the surface of the case 50. The above-described case 50 may be manufactured in this manner.

The case 50 includes a front case 50a and a rear case 50b divided at a predetermined portion (See FIG. 2). In a state of being divided into a case body and a lid portion, the above-described image pickup unit 22 and the prisms 30, 32, and a prism holder 40 are stored in the case body and subsequently, the divided structures are assembled and integrated. In FIG. 3 and FIG. 4, the front case 50a and the rear case 50b are shown in the assembled and integrated state.

The image pickup unit 22 is structured in such a manner that a single image pickup device 24 such as a CCD, an image pickup lens 23, and a substrate 26 having a processing circuit unit such as a drive circuit integrated thereon are assembled in a cylindrical holder (cylindrical mirror) 25 (See FIG. 4).

The image pickup lens 23 is structured, for example as a compound lens having a plurality of lenses assembled together. By assembling the image pickup lens 23 and the image pickup device 24, a desired horizontal angle of view and a vertical angle of view may be obtained.

The image pickup lens 23 is disposed on the front side of the image pickup device 24. More specifically, a vertical center axis P2 of an image pickup surface 24a of the image pickup device 24 is disposed at a position shifted upward by a predetermined dimension (for example, 0.6 mm) from a center axis (optical axis) P3 of the image pickup lens 23 in a state in which the image pickup surface 24a of the image pickup device 24 is disposed in parallel with the direction of the lens surface of the image pickup lens 23. Accordingly, as will be described later, an incident beam 72 entering from the transparent window 52U located at the lower front via a wide-angle lens 58 and the image pickup lens 23 form an image on the upper region of the image pickup surface 24a without running over the image pickup surface 24a of the image pickup device 24.

The pair of left and right prisms 30 and 32 are each formed substantially into a triangle prism in mirror image relation with respect to each other. The pair of left and right prisms 30 and 32 are disposed in front of the image pickup lens 23 so as to cover the upper portion of the image pickup lens 23 in a state in which a column axes P1 of the prisms are substantially orthogonal to the center axis P3 of the image pickup lens 23 (See FIG. 4) and are disposed in plane symmetry with respect to a plane dividing the image pickup lens 23 into left and right halves (that is, in bilateral symmetry) (See FIG. 3).

In the arrangement described above, the left (right) prism 30 (32) is oriented so that the apex angle a thereof is directed toward the front and the prism side surface 30L (32R) on the left (right) faces the transparent window 52L (52R) on the left (right) side of the case 50, that is, faces the side visual field. In this arrangement, the prism rear surface 30B (32B) faces the image pickup lens 23. While the left (right) prism side surfaces 30L (32R) and the prism rear surface 30B (32B) of the left (right) prism 32 (32) are maintained to be transmittable surfaces, the right (left) prism side surface 30R (32L) thereof is formed with a deposited metal layer such as aluminum, and is further formed with a protective film (not shown) of a black coating material thereon so as to cover the deposited surface so that the inner surface serves as a reflecting surface (mirror surface).

Accordingly, the light beams 70L and 70R from both side of the image pickup unit 22 pass through the transparent windows 52L and 52R of the case 50, enter into the one prism side surface 30L (32R) of the prism 30 (32), are reflected internally twice between the prism side surface 30L (32R) and the prism side surface 30R (32L), and finally are emitted from the prism rear surface 30B (32B) toward the image pickup lens. Accordingly, an image of visual field in front of the camera device 20 on both of the left and right sides is obtained in the desired upper region Vu of the vertical angle of view of the camera device 20.

Bottom surfaces 30A and 32A of the pair of left and right prisms 30 and 32 are finished into inclined planes inclining outward (downward) toward the front (See FIG. 4).

More specifically, the bottom surfaces 30A and 32A are formed so as to incline along the lower boundary surface within the effective image pickup range of the prisms 30 and 32 defined by taking the difference in refractive index between the prisms 30 and 32 and air into account.

Figure 6:
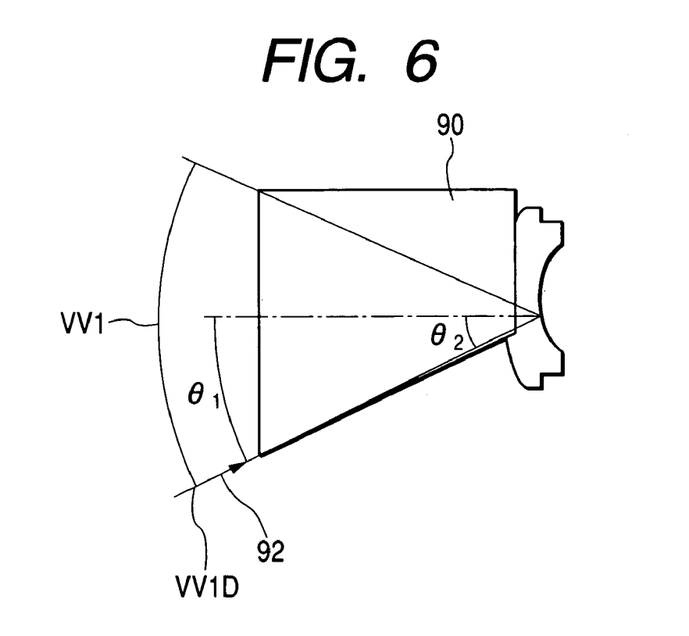
FIG. 6 is an explanatory drawing showing a passage of a light beam in a virtual prism having the same refractive index as air.

In other words, as shown in FIG. 6, a virtual prism 90 having substantially the same refractive index as air is assumed and the image pickup range in the vertical direction of an image to be picked up with the intermediary of the virtual prism 90 is considered. In this case, a light beam 92 proceeds linearly when entering into the virtual prism 90 without being refracted. Therefore, in design of such virtual prism, the angle of inclination q1 of a lower boundary surface VV1D of a range of image VV1 that want to be obtained through the virtual prism 90 with respect to the horizontal direction is determined to match the angle of inclination q2 of the bottom surface of the virtual prism 90 with respect to the horizontal direction.

However, in practical, the prisms 30 and 32 having a refractive index larger than the refractive index of air are used. For example, a glass material of BK7 having a refractive index of 1.517 is used.

Figure 7:
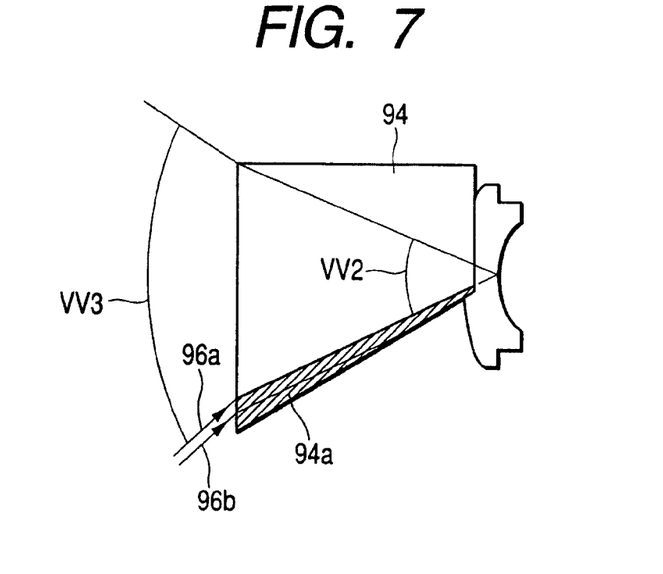
FIG. 7 is an explanatory drawing showing a passage of a light beam in a virtual prism having the refractive index larger than the refractive index of air.

Therefore, a virtual prism 94 having a refractive index larger than the refractive index of air and having a bottom surface at the same angle of inclination as the bottom surface of the aforementioned virtual prism 90 is assumed. In this case, as shown in FIG. 7, when a light beam 96a enters the virtual prism 94, the light beam 96a is refracted to a direction closer to the normal line of the incident surface. Therefore, a light beam 96b entered into the virtual prism 94 from the range in the vicinity of the bottom portion thereof enters into the bottom surface of the virtual prism 94, and thus does not contribute to the pickup image. As a consequence, an effective imaging range VV2 in the virtual prism 94 becomes narrower than the case shown in FIG. 6, and thus the bottom portion of the virtual prism 94 becomes an ineffective portion 94a which does not contribute to imaging (the hatched region in FIG. 7).

Accordingly, in the present embodiment, when designing the prisms 30 and 32, the angles of inclination of the bottom surfaces 30A and 32A of the prisms 30 and 32 are determined so as to avoid or minimize generation of the ineffective portion 94a that does not contribute to the pickup image, considering the actual range of image VV3 (See FIG. 7) that wants to be obtained with the intermediary of the prisms 30 and 32 and the difference in refractive index between the air and the prisms 30 and 32.

In other words, when forming the prisms 30 and 32, the bottom portion of the prism 120 shown in FIG. 8 which corresponds to the ineffective region VRu on the upper side is totally or partially removed. Consequently, the ineffective region VRu on the upper side shown in FIG. 8 is minimized so that the ineffective region of the pickup image caused by the ineffective region VRu is minimized.

The bottom surfaces 30A and 32A of the respective prisms 30 and 32 are light shielded. More specifically, the bottom surfaces 30A and 32A are roughened by blast processing, and applied with black coating material having a high refractive index. Consequently, the internal reflection and the external reflection on the bottom surfaces 30A and 32A are prevented, and thus formation of a ghost image is prevented.

At least part of the ridged portion surrounding rear surfaces 30B and 32B of the respective prisms 30 and 32 are not chamfered, and hence has an angular shape formed of surfaces intersecting with each other.

In the present embodiment, ridgelines 30C and 32C formed by intersecting the rear surface 30B and 32B and the bottom surfaces 30A and 32A are not chamfered, and hence has an angular shape formed of surfaces intersecting with each other.

The reason why the ridgelines 30C and 32C are formed into an angular shape is shown below.

Normally, in the case of a glass prism, for example, the ridgeline formed by surfaces intersecting with each other is chamfered in order to prevent chipping. However, since the rear surfaces 30B and 32B of the prisms 30 and 32 are parallel with the lens surface of the image pickup lens 23 and the bottom surfaces 30A and 32A thereof are inclined downward toward the front, the rear surfaces 30B and 32B and the bottom surfaces 30A and 32A intersect at an obtuse angle. Therefore, as regards the ridgelines 30C and 32C formed by the rear surfaces 30B and 32B and the bottom surfaces 30A and 32A intersecting with each other, it is not necessary to chamfer in order to prevent chipping. From this reason, the ridgelines 30C and 32C are not chamfered and left as is in the angular shape formed by the surfaces intersecting with each other. Consequently, the portions of boundaries of the pickup image picked up with the intermediary of the prisms 30 and 32 corresponding to the ridgelines 30C and 32C may be advantageously clarified.

Though the present embodiment is structured of the pair of prisms 30 and 32, the construction in which only one of the pair of prisms 30 and 32 is provided is also applicable when imaging only one side of the visual field.

It is also possible to structure to pick up images in both of the left and the right directions by means of a single prism as optical means. In this case, a single prism in the shape of a triangle prism is disposed in front of the image pickup unit 22 so that light beams from the visual field on both of the left and the right sides of the camera device 20 are entered into the prism from the corresponding prism side surfaces, then are reflected once internally on the prism side surfaces on the opposite sides of the above-described directions in the visual field, and then are emitted form the prism rear surface toward the image pickup lens 23.

The prism holder 40 is a member for supporting the above-described pair of prisms 30 and 32 at predetermined positions in front of the image pickup unit 22, and includes a mounting portion 42 to be mounted, for example, to a back side member in the case 50, and a prism supporting unit 44 including a pair of prism receiving recesses 46 and 48 capable of receiving the respective prisms 30 and 32 in a state of covering the image pickup unit 22.

The prism receiving recesses 46 and 48 each are formed into a shape of triangular hole surrounded by inner peripheral surface corresponding to the outer periphery of each of the prisms 30 and 32, and the respective prism receiving recesses 46 and 48 are opened on top. The bottoms of the respective prism receiving recesses 46 and 48 are formed with tapered supporting members 47, 49 extending obliquely along the same directions as the bottom surfaces 30A and 32A of the prisms 30 and 32. When the respective prisms 30 and 32 are inserted into the respective prism receiving recesses 46 and 48 from the upper openings thereof along the above-described directions in a state in which the column axes P1 of the prisms 30 and 32 are maintained in the direction substantially perpendicular to the optical axis P2 of the image pickup lens 23, the bottom surfaces 30A and 32A of the respective prisms 30 and 32 abut against and are supported by the inner surfaces (upper surfaces) of the tapered supporting members 47 and 49, and are maintained at predetermined postures with respect to the image pickup unit 22 as described above in a state in which the side surfaces and the rear surfaces of the respective prisms 30 and 32 are surrounded by the inner surfaces of the respective prism receiving recesses 46 and 48.

The tapered supporting members 47 and 49 are formed so as to be reduced in thickness gradually toward the image pickup unit 22 (See FIG. 4). Accordingly, the portions of the tapered supporting members 47 and 49 in the vicinity of the image pickup unit 22 are relatively thin, so that the intervention of the tapered supporting members 47 and 49 in the image is minimized. At the same time, the portions of the tapered supporting members 47 and 49 far from the image pickup unit 22 are relatively thick so that the sufficient strength for supporting the prisms 30 and 32 is achieved. Preferably, such tapered supporting members 47 and 49 have a thickness that can be accommodated within the portion corresponding to the portion of prism removed as the ineffective portion 94a shown in FIG. 7.

Both of the outer sides and the image pickup unit 22 side of the respective tapered supporting members 47 and 49 are formed with predetermined openings, so that the light beam can enter into the image pickup unit 22 with the intermediary of the prisms 30 and 32 without being blocked by the prism holder 40.

The camera device 20 is provided with the wide-angle lens 58 as a sub-image pickup lens so as to cover the portion of the image pickup lens 23 other than the portion covered by the prisms 30 and 32 (lower region).

For example, the wide-angle lens 58 is mounted to and supported by the mounting portion 42 of the prism holder 40, and is disposed downwardly of the respective prisms 30 and 32 with the intermediary of the tapered holding portions 47 and 49.

Specifically, the wide-angle lens 58 is disposed in such a manner that the upper end of the wide-angle lens 58 is positioned as close as possible to the relatively thin portions of the tapered supporting members 47 and 49 in the vicinity of the ends on the image pickup unit 22 side. Accordingly, the distance between the wide-angle lens 58 and the prisms 30 and 32 can be minimized so that the range that can be picked up via the wide-angle lens 58 or the prisms 30 and 32 may be maximized.

The wide-lens 58 employed here is designed as appropriate so that an image located on the lower front side in the visual field of the camera device 20 can be picked up. For example, a lens having a shape like a concave lens with the upper half portion removed can be employed.

In the camera device 20 in this arrangement, sights in three directions including both of the left and the right directions and the lower front direction in front of the camera device 20 can be picked up simultaneously based on the principle shown below.

As regards the lower region Vd of the vertical angle of view of the image pickup unit 22, as shown in FIG. 4, the light beam 72 coming from the range of visual field to be picked up in front of the case 50 (that is, obliquely the lower front direction) passes through the transparent window 52U of the case 50 without passing through the prisms 30 and 32, passes through the wide-angle lens 58. Then, it is converged by the image pickup lens 23, and hence forms an image as an inverted image on the upper half region of the image pickup surface 24a of the image pickup device 24. Accordingly, the sight in the lower front direction is picked up by the image pickup device 24. Simultaneously, as regards the lower region Vd of the vertical angle of view of the image pickup unit 22, as shown in FIG. 3, the light beam 70L (70R) from the range of visual field to be picked up on the left (right) side (that is, the left (right) side in front) of the case 50 passes through the transparent window 52L (52R) of the case 50, and enters from the prism side surface 30L (30R) on the left (right) side of the left and right prism 30 (32). Then, it is reflected internally on the prism side surface 30R (32L) on the right (left) side, and then is reflected internally on the prism side surface 30L (32R) on the left (right), and hence is mirror-inverted totally twice in the left (right) prism 30 (32), and is finally emitted from the rear prism surface 30B (32B) of the prism. Subsequently, it is collected by the image pickup lens 23, and forms an image as an inverted image on the right (left) half region of the lower region of the image pickup surface 24a of the image pickup device 24. Accordingly, the image pickup device 24 pick up an image of the sight on both of the left and the right sides. In this manner, a single image pickup device 24 picks up an image of the sights of three directions, that is, both of the left and the right directions and the lower front direction of the camera device 20, simultaneously. Then, the picked up image is, for example, inverted as a whole and outputted to the control unit 10.

As regards the upper region Vu and the lower region Vd of the vertical angle of view shown in FIG. 4, a light beam is conceptually shown while ignoring refraction when entering the prisms 30 and 32 or the wide-angle lens 58.

In the camera device 20, since the pickup image is inverted as a whole (that is, not partly), as shown in FIG. 5 for example, a pickup image 82L on the left side in front is displayed on a left half region 75L of the upper half region 75 of the display image as an upright image, a pickup image 82R on the right side in front is displayed on a right half region 75R of the upper half region 75 of the display image as an upright image, and a pickup image 81 on the lower front side is displayed on the lower half region 76 of the display image as an upright image.

In the display image, an ineffective range Vr exists because there exists the tapered supporting members 47 and 49 between the upper region Vu and the lower region Vd. In addition, an ineffective region 77, in which the tapered supporting members 47 and 49 are intervened in the image, is generated between the pickup images 82L and 82R on both of the left and the right directions in front of the camera device 20 and the pickup image 81 on the lower front of the camera device 20 due to the ineffective region Vr. However, since the tapered holding members 47 and 49 are formed to be relatively thin at the portions in the vicinity of the image pickup unit 22, the extent of intervention of the tapered supporting members 47 and 49 is small and thus the ineffective region 77 may be minimized.

Though the ridgelines 30C and 32C of the prisms 30 and 32 are displayed along boundaries 82La and 82Ra of the pickup images 82L and 82R on the side of the pickup image 81 of the lower front side, since the ridgelines 30C and 32C each have an angular shape, the boundaries are relatively clear.

The control unit 10 is provided with the image processing unit 11 for performing predetermined image processing on the pickup image of the camera device 20.

The image processing includes, for example, correction of inclination of the sight displayed on the image display sections for each image pickup directions (the left and the right directions in front and the lower front direction) on the pickup image of the camera device 20, interpolation thereof, and enlargement of the image display sections for each image pickup directions on the pickup image.

The control unit 10 displays an image, which is processed as described above, on the display device 12 at a predetermined timing.

According to the camera device arranged as described above, the tapered supporting members 47 and 49 are formed so as to be reduced in thickness gradually toward the image pickup unit 22, the portion of the tapered supporting members 47 and 49 in the vicinity of the image pickup unit 22 are relatively thin. Therefore, the intervention of the tapered supporting members 47 and 49 into the image may be minimized.

Specifically, with such tapered supporting members 47 and 49, the intervention of the tapered supporting members 47 and 49 are minimized between the images taken by the camera device 20 in both of the left and the right directions which are picked up with the intermediary of the prisms 30 and 32 and the image taken by the camera device 20 in the lower front direction without the intermediary of the prisms 30 and 32.

As regards the ridgelines 30C and 32C formed by the rear surfaces 30B and 32B and the bottom surfaces 30A and 32A of the prisms 30 and 32 intersecting with each other, since it is left as is in the angular shape formed by the surfaces intersecting with each other, the boundary portions 82La and 82Ra of the boundaries corresponding to the ridgelines 30C and 32C of the images 82L and 82R to be picked up with the intermediary of the prisms 30 and 32 may be relatively clarified.

Such construction in which the intervention of the tapered supporting members 47 and 49 in the image may be minimized, and the construction in which the boundary between the image on both of the left and the right directions of the camera device 20 and the image on the lower direction of the camera device 20 picked up without the intermediary of the prisms 30 and 32 may be relatively clarified are specifically effective when they are applied in the camera device or the vehicle periphery monitoring apparatus in which the image processing is performed on the entire region of the image picked up by the image pickup unit 22 (for example, entire-range batch inverting process) and the images are displayed as is without changing the layout on the display device.

In addition, since at least one prism 30 (32) of a triangle prism shape is used, and the light beam 70L (70R) from the directions in the visual field on the left (right) side of the camera device 20 is reflected twice internally of the prism 30 (32) on the corresponding side (that is, twice mirror reflections are effected) between both of the prism side surfaces 30L and 30R (32L and 32R) on the direction in the visual field and on the opposite direction in the visual field and is guided toward the image pickup lens 23, the light beam 70L (70R) from the directions in the visual field on both of the left and the right sides in front of the camera device 20 can be guided toward the image pickup lens 23 without mirror inverting the light beam. Accordingly, the pickup images in all the directions in the visual field of the camera device 20 can be picked up simultaneously in the same inverted state by the camera device 20 (that is, by a single image pickup device 24), and thus the pickup image sections in all the directions in the visual field of the pickup image of the image pickup device 24 can be corrected to an upright image simply by inverting the pickup image of the image pickup device 24 entirely but not partly.

Since such prisms 30 and 32 are provided as a pair on both of the left and the right sides, the left and the right directions in the visual field can be picked up simultaneously.

As described thus far, according to the present invention, the tapered supporting members of the supporting means are formed so as to be reduced in thickness gradually toward the image pickup means, and thus the portion of the tapered supporting members located in the vicinity of the image pickup means are relatively thin. Therefore, the intervention of the supporting means in the image can be minimized.

According to the invention, since the light beam from the side visual field is entered from the one prism side surface on the corresponding side visual field and is reflected twice internally (that is, twice mirror reflections are effected) between the one prism side surface and the other prism side surface, and then guided toward the image pickup lens, the light beam from the side visual field can be guided toward the image pickup lens without mirror inverting the light beam. Accordingly, the image picked up with the intermediary of the prism and the image picked up without the intermediary of the prism can be picked up simultaneously in the same inverted state by the camera device (that is, by a single image pickup device).

According to the invention, the left and the right directions in the visual field can be picked up simultaneously by the pair of prisms.

According to the invention, the intervention of the supporting means in the image between the image picked up with the intermediary of the prism and the image picked up without the intermediary of the prism can be minimized.

According to the camera device in the present invention, since at least part of the ridge portion surrounding the prism rear surface has an angular shape formed of surfaces intersecting with each other, at least part of the boundaries of the image picked up with the intermediary of the prism can be clarified.

According to the camera device of the present invention, an image can be picked up with the intermediary of the sub-pickup lens, but without the intermediary of the prism.

Although the present invention has been shown and described with reference to a specific embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. A camera device for imaging a plurality of directions in a visual field simultaneously, the device comprising:
   an image pickup unit having a single image pickup device and an image pickup lens disposed in front of the image pickup device;
   an optical unit disposed in front of the image pickup unit and configured to guide incident light from a plurality of directions in the visual field to the image pickup unit; and
   a supporting unit for supporting the optical unit,
   wherein the supporting unit comprises a tapered supporting member having a thickness gradually reduced toward the image pickup unit.

2. The camera device as claimed in claim 1, wherein the optical unit comprises a prism formed substantially in a triangle prism including a rear prism surface and a pair of side prism surfaces, the rear prism surface facing the image pickup lens, and one prism side surface facing a side visual field of the image pickup unit, the prism allowing an incident light entered through the one prism side surface to be reflected twice internally between the one prism side surface and the other prism side surface and then to output through the prism rear surface, and guiding the light beam toward the image pickup lens.

3. The camera device as claimed in claim 2, wherein the prism comprises a pair of left and right prisms disposed symmetrically on the front side of the image pickup unit, and
   wherein the left prism is arranged that a left prism side thereof faces toward the left visual field and the right prism is arranged that a right prism side thereof faces the right visual field.

4. The camera device as claimed in claim 2, wherein the tapered supporting member is disposed between an image pickup range of an image to be picked up with the intermediary of the prism and the image pickup range of an image to be picked up without the intermediary of the prism.

5. The camera device as claimed in claim 2, wherein at least part of a ridged portion surrounding the rear surface of the prism has an angular shape formed of surfaces intersecting with each other.

6. The camera device as claimed in claim 1, wherein the supporting unit is configured to support the optical device to be inserted along a direction substantially perpendicular to the optical axis of the image pickup lens, and
    wherein the tapered supporting member is configured to receive the optical device on the opposite side from the side on which the optical device is inserted and supports the same.

7. The camera device as claimed in claim 1, wherein the optical unit is disposed so as to cover a part of the image pickup lens, and further comprises a sub-image pickup lens disposed so as to cover other part of the image pickup lens.

8. A vehicle periphery monitoring apparatus comprising:
    a camera device mounted on a vehicle and configured to pick up images of a plurality of directions in a visual field simultaneously;
    a processing unit configured to process the image picked up by the camera device; and
    a display unit installed in a cabin of the vehicle and configured to display the image processed by the processing unit,
    wherein the camera device comprises:
    an image pickup unit having a single image pickup device and an image pickup lens disposed in front of the image pickup device;
    an optical unit disposed in front of the image pickup unit and configured to guide incident light from a plurality of directions in the visual field to the image pickup unit; and
    a supporting unit for supporting the optical unit,
    wherein the supporting unit comprises a tapered supporting member having a thickness gradually reduced toward the image pickup unit.

9. The vehicle periphery monitoring apparatus as claimed in claim 8, wherein the optical unit comprises a prism formed substantially in a triangle prism including a rear prism surface and a pair of side prism surfaces, the rear prism surface facing the image pickup lens, and one prism side surface facing a side visual field of the image pickup unit, the prism allowing an incident light entered through the one prism side surface to be reflected twice internally between the one prism side surface and the other prism side surface and then to output through the prism rear surface, and guiding the light beam toward the image pickup lens.

10. The vehicle periphery monitoring apparatus as claimed in claim 9, wherein the prism comprises a pair of left and right prisms disposed symmetrically on the front side of the image pickup unit, and
    wherein the left prism is arranged that a left prism side thereof faces toward the left visual field and the right prism is arranged that a right prism side thereof faces the right visual field.

11. The vehicle periphery monitoring apparatus as claimed in claim 9, wherein the tapered supporting member is disposed between an image pickup range of an image to be picked up with the intermediary of the prism and the image pickup range of an image to be picked up without the intermediary of the prism.

12. The vehicle periphery monitoring apparatus as claimed in claim 9, wherein at least part of a ridged portion surrounding the rear surface of the prism has an angular shape formed of surfaces intersecting with each other.

13. The vehicle periphery monitoring apparatus as claimed in claim 8, wherein the supporting unit is configured to support the optical device to be inserted along a direction substantially perpendicular to the optical axis of the image pickup lens, and
    wherein the tapered supporting member is configured to receive the optical device on the opposite side from the side on which the optical device is inserted and supports the same.

14. The vehicle periphery monitoring apparatus as claimed in claim 8, wherein the optical unit is disposed so as to cover a part of the image pickup lens, and further comprises a sub-image pickup lens disposed so as to cover other part of the image pickup lens.

* * * * *